United States Patent [19]

Bronnes et al.

[11] 4,431,709

[45] Feb. 14, 1984

[54] BERYLLIUM TO METAL SEALS AND METHOD OF PRODUCING THE SAME

[75] Inventors: Robert L. Bronnes, Irvington; Richard C. Sweet, N. Tarrytown; James D. O'Grady, Irvington, all of N.Y.

[73] Assignee: North American Philips Corporation, New York, N.Y.

[21] Appl. No.: 427,057

[22] Filed: Sep. 29, 1982

[51] Int. Cl.³ .............................................. C23C 15/00
[52] U.S. Cl. .................................... 428/649; 428/661; 428/674; 428/680; 428/678; 428/926; 204/192 C; 228/219
[58] Field of Search ............... 428/649, 661, 674, 680, 428/926, 678; 204/192 R, 192 C, 192 SP; 228/219, 124, 208; 313/59

[56] References Cited

U.S. PATENT DOCUMENTS 3,083,451  4/1963  Atkinson ............................ 228/219
3,779,721  12/1983  Herman ............................. 428/649
4,140,592  2/1979  Orlando .......................... 204/192 C

*Primary Examiner*—L. Dewayne Rutledge
*Assistant Examiner*—Debbie Yee
*Attorney, Agent, or Firm*—Norman N. Spain

[57] ABSTRACT

Beryllium to metal seals are produced by forming on a beryllium surface by cathode sputtering a first metal layer from a group of metals including tantalum, niobium, zirconium, hafnium, titanium or vanadium, an intermediate cathode sputtered layer of a refractory metal and outer layer of a readily brazable metal and soldering the readily brazable layer to another metallic body.

8 Claims, 1 Drawing Figure

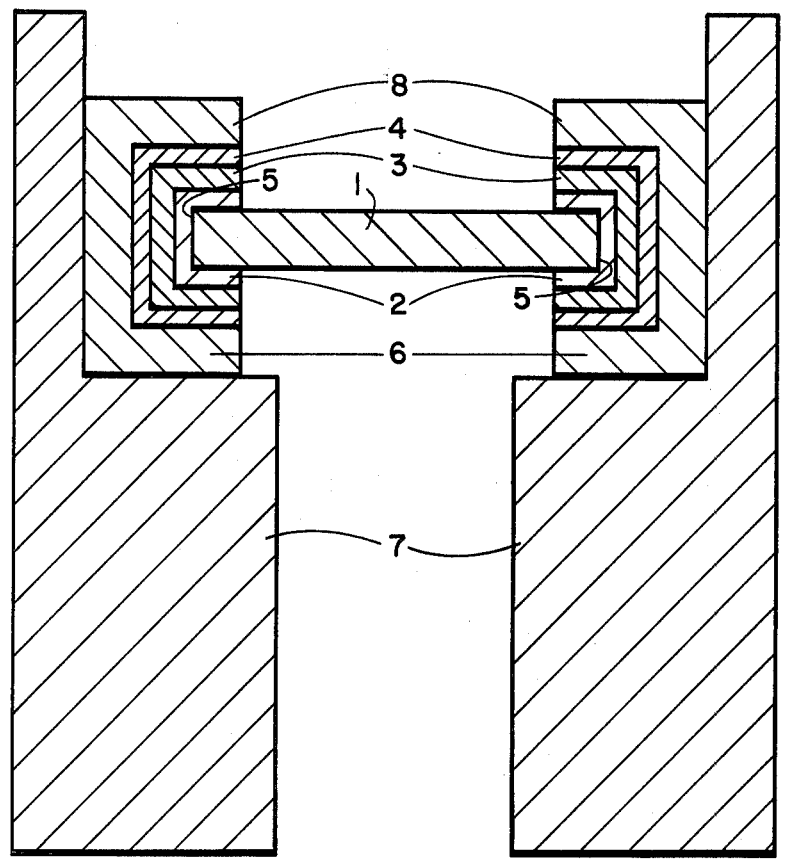

BERYLLIUM TO METAL SEALS AND METHOD OF PRODUCING THE SAME

BACKGROUND OF THE INVENTION

This invention relates to an intermediate seal comprising a beryllium body hermetically sealed to another metallic body formed of a metal the coefficient expansion of which is approximately that of beryllium. The invention also relates to a method for producing such seals.

Intermetallic seals comprising beryllium bodies hermetically joined to other beryllium or other metallic bodies are well-known in the art.

Hanks et al, U.S. Pat. No. 3,090,117, discloses a method for joining together beryllium metal parts by brazing in which a silver aluminum alloy brazing metal is employed and a lithium halide flux is used during the brazing operation. A major difficulty with this method is that due to the reactivity between the lithium and the beryllium the seals have rather a short life span particularly at high temperatures.

Atkinson, U.S. Pat. No. 3,083,451 shows a method of producing a seal between a beryllium and a base metal such as a Monel metal by brazing. Preferably employing a silver copper palladium alloy as a brazing alloy. The brazing procedure is carried out in several steps. The assembly of beryllium metal, brazing solder and base metal is heated in a vacuum first to a temperature between 830° C. and 840° C. and then to a temperature of 910° C. and then rapidly cooled to a temperature of 700° C.

The problem with this method is that it is a complex method requiring several stages of heating and cooling. In addition, as shown in column 2, lines 49–51 the resultant joints are not usable at temperatures above 700° C.

Atkinson, U.S. Pat. No. 3,105,294 shows a method of brazing beryllium in which the beryllium is first etched in an atmosphere of cracked ammonia and then treated in a hot cyanide bath. After which the layer of copper is electroplated onto the etched surface and the copper-plated region is then joined to a base metal frame by brazing in a vacuum or hydrogen atmosphere at a temperature above that of the liquidus temperature of the solder.

The defects in this method is that it requires use of the highly toxic and environmentally dangerous cyanide bath. In addition it is necessary that the brazing be carried out at high temperatures in order to complete the bond between the beryllium surface and the electro deposited copper layer.

Adams et al, U.S. Pat. No. 3,420,978 shows a method of brazing beryllium to another beryllium body or another material in which a thin layer of zirconium or titanium is vacuum deposited on the surface of beryllium and a high purity aluminum is employed as a brazing material, the brazing being carried out at temperatures between 1550° F.–1650° F. and preferably at 1730° C.

Here too the problem exists that due to the fact that since a good tight bond is not developed between the titanium and zirconium layer and the beryllium surface during the vacuum deposition process it is necessary to bring the temperature of the surface to a very high temperature during the brazing operation in order to form a tight bond between the beryllium surface and the titanium or zirconium layer and in order that the brazed bond be stable at extremes of temperature.

Herman, U.S. Pat. No. 3,779,721, shows a method of joining two beryllium bodies by brazing in which successive layers of silver and nickel are deposited on the beryllium surfaces. Here too brazing is carried out at a high temperature for example 1490° C.

SUMMARY OF THE INVENTION

An object of this invention is to provide beryllium to metal seals that are stable at not only at room temperatures but at highly elevated temperatures including temperatures above 700° C.

Another object of this invention is to provide a method of forming beryllium to metal seals in which the soldering operation may be carried out at moderate temperatures.

These and other objects of the invention will be apparent from the description that follows.

According to the invention it has been found that an excellent intermetallic seal comprising a beryllium body and another metal body formed of a metal having a coefficient of expansion which has approximately that of beryllium may be formed by a novel process wherein the surface of the beryllium to be joined to the other metal body is provided with a three layer metal coating prior to soldering.

According to the invention this is effected by cathode sputtering a thin layer of a metal selected from tantalum, niobium, zirconium, hafnium, titanium and vanadium on the beryllium metal surface, by cathode sputtering upon this thin first metal layer a second metal layer of a refractory metal layer and then depositing upon this refractory metal layer a thin outer cathode sputtered layer of a readily brazable metal.

Preferably the first cathode sputtered layer has a thickness of about 1,000 Å–5,000 Å, the second cathode sputtered layer has a thickness of about 4,000 Å to 10,000 Å and the third and the outer layer the layer of the readily brazable metal layer has thickness of about 4,000 Å to 10,000 Å.

As examples of the refractory metal forming the intermediate layer, metals such as molybdenum and tungsten may be employed. Examples of the readily brazable metals forming the outer layer are nickel and copper.

After deposition of the three metal layers the beryllium body is then joined, at the coated surface to a metal body having an approximately similar coefficient of expansion. Joining of the two bodies is accomplished by soldering which includes brazing as well as soft soldering.

Examples of metal bodies of similar coefficient of expansion are alloys of copper and nickel alloys such as the Monel metals and alloys of iron, nickel and cobalt such as the Kovar metals.

The cathode sputtering operation may be carried out by any of the procedures known in the art. A particularly useful procedure is that described in Bronnes et al, U.S. Pat. No. 3,339,267, column 3, line 50–column 4, line 62 which is hereby incorporated by reference.

The layers deposited by the cathode sputtering form a bond of excellent adherence to the beryllium substrate and as a result it is found not necessary to employ high temperatures during the soldering operation in order to provide a secure bond between the deposited layers and the beryllium body. Various soldering techniques may be employed using temperatures as low as 100° C. and low melting solders such as a indium-tin-cedmium alloy may be used.

However, in order to optimize the strength of the seal between the two bodies it has found that brazing techniques are most useful.

Braze metals such as the silver-copper eutectic alloy may be readily employed. Other braze metals such as palladium-silver-copper alloys and gold-nickel-platinum alloys may also be readily employed.

Brazing is carried out in a non-oxidizing atmosphere, a vacuum or hydrogen atmosphere being preferred.

The method of the invention provides an advantage in that it is possible, by this method to securely seal beryllium bodies as thin as 250 microns or less to other metal bodies.

Another advantage is that it has been found that the resultant seals have excellent thermal stability, it being found that the resultant beryllium to metal seals may be cycled many times from room temperature to temperatures as high as 960° C. without any damage to the seal.

These advantages are of particular importance in X-ray tubes employing beryllium windows where high temperatures are produced and it is advantageous to have the windows as thin as possible.

The method of the invention is useful also in producing beryllium seals for structures useful in aerospace applications as in many cases welding techniques need not be employed and there is consequently less grain growth and the resultant structures are therefore stronger.

BRIEF DESCRIPTION OF THE DRAWINGS

The sole FIGURE in the drawing is an enlarged axial cross-sectional view of a beryllium to metal seal provided according to the invention.

DESCRIPTION OF THE PREFERRED EMBODIMENTS

The invention will now be described in greater detail with reference to the drawing.

A cylindrical beryllium window 1 having a thickness of about 250 microns is degreased in acetone and etched in a 5% solution of HF in methyl alcohol for about 1 minute with mild agitation. The beryllium window is then washed with fresh alcohol and blown dry with a clean compressed inert gas.

By use of a cathode sputtering technique described in the above-mentioned Bronnes et al U.S. Pat. No. 3,339,267 successive layers of a 4,500 Å thick titanium layer 2, 8,000 Å thick molybdenum layer 3 and a 5,000 Å thick nickel layer 4 are applied to each of the two planar surfaces 5 of the beryllium window 1. The thus coated beryllium window 1 is then inserted between the opposing surfaces 6 of a closedly fitting Kovar metal frame 7.

A silver-copper alloy braze metal 8 is then inserted between the surfaces of the Kovar metal frame 7 and the two outer nickel coatings 4. While pressed together, brazing of the resultant assembly is carried out in an atmosphere of dry hydrogen at a temperature of about 780° C.

The resultant intermetallic seal is found to be vacuum tight and stable even when cycled for many times between room temperature and 960° C.

While we have described the invention with reference to particular examples and applications thereof other modification will be apparent to those skilled in the art without departing from the spirit and scope of the invention as defined in the appended claims.

What we claim is:

1. An intermetallic seal comprising a beryllium body having thereon a thin first cathode-sputtered layer of a metal selected from the group consisting of tantalum, niobium, zirconium, hafnium, titanium, and vanadium, a thin intermediate cathode-sputtered layer of a refractory metal, and a thin outer cathode-sputtered layer of a readily brazable metal, said outer layer being hermetically sealed to a metallic body formed of a metal the coefficient of expansion of which is approximately that of beryllium.

2. An intermetallic seal comprising a beryllium body having thereon a first cathode-sputtered 1,000 Å–5,000 Å thick layer of a metal selected from the group consisting of tantalum, niobium, zirconium, hafnium, titanium, and vanadium, an intermediate cathode-sputtered 4,000 Å–10,000 Å thick layer of a refractory metal and an outer cathode-sputtered 4,000 Å–10,000 Å thick layer of a readily brazable metal, said outer layer being hermetically sealed to a metallic body formed of a metal the coefficient of expansion of which is approximately that of beryllium.

3. The intermetallic seal of claim 2, wherein the refractory metal is selected from the group consisting of molybdenum and tungsten.

4. The intermetallic seal of claim 1, 2 or 3, wherein the readily brazable metal is selected from the group consisting of nickel and copper.

5. The intermetallic seal of claim 4, wherein the metallic body is formed of an iron, nickel and coabalt alloy or of a nickel and copper alloy, the first cathode-sputtered layer is a 4,500 Å thick titanium layer, the intermediate cathode-sputtered layer is a molybdenum layer of a thickness of about 8,000 Å and the outer cathode-sputtered layer is a nickel layer of a thickess of about 5,000 Å.

6. A method of hermetically sealing a beryllium body to a metallic body formed of a metal having a cofficient of expansion approximately that of beryllium comprising the steps:
   (a) applying, by cathode sputtering, on a clean surface portion of said beryllium body a first thin layer of a metal selected from the group consisting of tantalum, niobium, zirconium, hafnium, titanium and vanadium,
   (b) applying by cathode sputtering a thin intermediate layer of a refractory metal,
   (c) applying by cathode sputtering on said intermediate layer a thin outer layer of a readily brazable metal,
   (d) and thin soldering said metallized surface of said beryllium body to said metallic body in a non-oxidizing atmosphere.

7. The method of claim 6, wherein the refractory metal is selected from the group consisting of molybdenum and tungsten.

8. The method of claim 6, wherein the thickness of the first layer is about 1,000 Å–5,000 Å, the thickness of the intermediate layer is about 4,000 Å–10,000 Å and the thickness of the outer layer is about 4,000 Å–10,000 Å.

* * * * *